No. 778,715. PATENTED DEC. 27, 1904.
L. W. SEESER.
PROCESS OF MAKING LINOLEUM.
APPLICATION FILED OCT. 14, 1902.
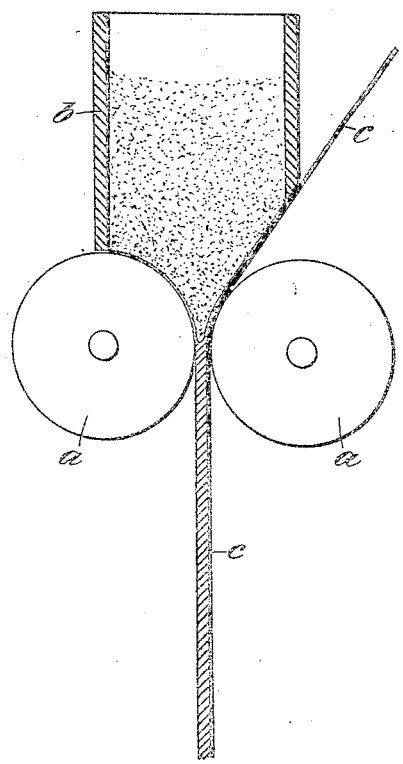
Witnesses.
Inventor:
Ludwig W. Seeser No. 778,715. Patented December 27, 1904.

UNITED STATES PATENT OFFICE.

LUDWIG WILHELM SEESER, OF DELMENHORST, GERMANY, ASSIGNOR TO THE FIRM OF BREMER LINOLEUMWERKE-DELMENHORST, OF DELMENHORST, OLDENBURG, GERMANY.

PROCESS OF MAKING LINOLEUM.

SPECIFICATION forming part of Letters Patent No. 778,715, dated December 27, 1904.

Application filed October 14, 1902. Serial No. 127,289.

*To all whom it may concern:*

Be it known that I, LUDWIG WILHELM SEESER, a subject of the Grand Duke of Oldenburg, and a resident of Delmenhorst, in the Grand Dukedom of Oldenburg, German Empire, have invented certain new and useful Improvements in Processes of Making Linoleum or the Like with Veins Passing Completely Through the Material, of which the following is a full, clear, and exact description.

This invention relates to a process for making linoleum or the like with veins passing completely through the material; and it consists in linoleum covering substance of various colors being passed from above in a vertical direction between two rollers arranged in proximity to one another. On the passage of the mass between the rollers the different-colored parts of the mass are uniformly drawn out in length through the entire thickness of the layer of material passing between the rollers, and thereby longitudinal veins are formed in the coating of the linoleum extending evenly and in a regular direction through the entire coating.

It is well known that the linoleum coating material on being passed between pressure-rollers undergoes a displacement, and thereby is formed into strips; but it has not hitherto been possible by utilizing this action to make a linoleum with lines resembling wood-veins passing completely through the material. This running of the substance into strips has hitherto been found a drawback, because rollers have hitherto been arranged one above the other and the linoleum substance was fed between them in a horizontal direction, by which arrangement an extension or displacement of the covering substance only on the uppermost side took place, while the under part of the same remained behind or dragged, so that thus a very uneven treatment of the coating substance in the upper and under layers was produced which yielded no satisfactory rolled product.

Linoleum uniformly striped all through to resemble veins of wood could not be made hitherto, but is now attainable by this improved method of treating it by arranging the pressure-rollers side by side and feeding the linoleum covering substance between them from above in a vertical direction.

An apparatus for carrying out this improved process is shown diagrammatically in the accompanying drawing.

$a$ represents the rollers placed side by side, to which the linoleum covering substance is conveyed from above in a vertical direction. Preferably the substance is simply spread in the center upon the two rollers $a$ from above, for which object a hopper or receiver for the substance $b$ may be arranged over the rollers in order that the mass scattered thereon may not fall over the outer sides of the rollers. The foundation web or fabric $c$ runs over one of the rollers. In this arrangement both rollers $a$ engage the linoleum covering substance quite uniformly, conveying the same in its entire thickness uniformly between them, thus drawing out the particles of the substance uniformly longitudinally, while in consequence of the various coloring of the substance a layer of coating results resembling wood-veins passing completely through the material. There is no lagging behind of the mass on the side of the foundation $c$, such as arises with rollers arranged one above the other, because there the foundation fabric rests on the under roller and the covering substance lies above the same, and in consequence of greater friction the foundation fabric and the lower part of the substance adjoining it cannot so quickly pass through and move forward as the upper part; but in this case there is no weight on the foundation fabric, and it does not rest on the roller adjoining it, and therefore an increase of friction on this side does not exist. The foundation fabric, on the other hand, with its adjoining layer of the coating, moves forward with an equal speed to that of the coating resting against the other roller, and consequently a uniform drawing out of the mass in its entire thickness is produced.

Having now described my invention, what I claim as new, and desire to secure by Letters Patent, is—

A process for making a veined or striped linoleum product having an equal elongation of the grains throughout the whole thickness of the product, said process consisting in first mingling materials of different colors into a loose mass, passing the various-colored mixture, together with a single fabric at one side thereof, between a pair of horizontal pressure-rollers, and causing the same with the fabric thereon to leave the mouth of the pressure-rollers in a vertical downward direction, and to hang freely therefrom to provide for uniformly drawing out the different-colored parts in vein-like stripes of equal elongation and extending longitudinally through and through the product.

In witness whereof I have hereunto set my hand in presence of two witnesses.

LUDWIG WILHELM SEESER.

Witnesses:
F. A. BRYCE,
C. DIEDERICH.